United States Patent
Kuelbs

(10) Patent No.: US 7,540,262 B2
(45) Date of Patent: *Jun. 2, 2009

(54) SOLAR POWERED BIRD FEEDER

(75) Inventor: Gregory G. Kuelbs, Westlake, TX (US)

(73) Assignee: World Factory, Inc., Irving, TX (US)

( * ) Notice: Subject to any disclaimer, the term of this patent is extended or adjusted under 35 U.S.C. 154(b) by 608 days.

This patent is subject to a terminal disclaimer.

(21) Appl. No.: 11/257,728

(22) Filed: Oct. 25, 2005

(65) Prior Publication Data

US 2006/0118055 A1 Jun. 8, 2006

Related U.S. Application Data

(63) Continuation-in-part of application No. 11/063,059, filed on Feb. 22, 2005, now Pat. No. 7,017,521, which is a continuation of application No. 10/847,973, filed on May 18, 2004, now Pat. No. 6,901,882, which is a continuation of application No. 10/411,565, filed on Apr. 10, 2003, now Pat. No. 6,830,009.

(60) Provisional application No. 60/372,267, filed on Apr. 11, 2002.

(51) Int. Cl.
*A01K 31/06* (2006.01)

(52) U.S. Cl. ........................... 119/452; 119/52.2

(58) Field of Classification Search .............. 119/52.3, 119/57.9, 452, 52.2, 53
See application file for complete search history.

(56) References Cited

U.S. PATENT DOCUMENTS

| | | | |
|---|---|---|---|
| 3,590,780 A | 7/1971 | Dunbar | |
| 4,523,546 A | 6/1985 | Latham | |
| 4,646,686 A | 3/1987 | Furlani | |
| 5,044,319 A | 9/1991 | Blasbalg | |
| 5,168,830 A | 12/1992 | Deglis | |
| 5,207,180 A | 5/1993 | Graham | |
| 5,259,337 A | 11/1993 | Rasmussen | |
| 5,463,980 A | 11/1995 | Rasmussen | |
| 5,549,075 A | 8/1996 | Golden | |
| 5,868,101 A | 2/1999 | Marshall | |
| 5,937,787 A | 8/1999 | Kopis | |
| 6,145,477 A | 11/2000 | Jansen | |
| 6,230,440 B1 | 5/2001 | Deutsch | |
| 6,276,298 B1 | 8/2001 | Welsh | |
| 6,363,891 B1 | 4/2002 | Marshall | |
| 6,481,375 B1 | 11/2002 | Scalf | |
| 6,584,933 B1 | 7/2003 | Stone | |
| 6,830,009 B1 | 12/2004 | Kuelbs | |
| 6,901,882 B2 * | 6/2005 | Kuelbs | 119/452 |
| 7,168,392 B2 * | 1/2007 | Kuelbs | 119/452 |
| 2003/0019437 A1 | 1/2003 | Fore | |
| 2003/0024480 A1 | 2/2003 | Meritt | |

* cited by examiner

*Primary Examiner*—Timothy D Collins
(74) *Attorney, Agent, or Firm*—James E. Walton

(57) ABSTRACT

A bird feeder having a rechargeable electrical power source and a solar energy system that collects solar energy, converts it into electrical energy, and uses the electrical energy to recharge the rechargeable electrical power source is disclosed. The rechargeable electrical power source can be used to power a wide variety of electrical devices, such as microphones, radio receivers or transmitters, cameras, audio recording and playback devices, video recording and playback devices, loud speakers, lighting elements, timing devices, remote controls, motors, etc.

18 Claims, 7 Drawing Sheets

SOLAR POWERED BIRD FEEDER

CLAIM OF PRIORITY

Cross-Reference to Related Applications

This application is a continuation-in-part of U.S. application Ser. No. 11/063,059, filed 22 Feb. 2005, now U.S. Pat. No. 7,017,521 titled "Solar Powered Bird Feeder," which is a continuation of U.S. application Ser. No. 10/847,973, filed 18 May 2004, titled "Solar Powered Bird Feeder," which issued on 7 Jun. 2005 under U.S. Pat. No. 6,901,882, which is a continuation of U.S. application Ser. No. 10/411,565, filed 10 Apr. 2003, titled "Solar Powered Bird Feeder," which issued on 14 Dec. 2004 under U.S. Pat. No. 6,830,009, which claims the benefit of U.S. Provisional Application No. 60/372,267, filed 11 Apr. 2002, titled "Solar Powered Bird Feeder."

BACKGROUND

1. Field of the Invention

The present invention relates to bird feeders. In particular, the present invention relates to bird feeders having electrical power sources.

2. Description of Related Art

Solar energy systems that collect solar energy and convert it into electrical energy have been around for many years. However, only recently have these solar energy systems been developed to the point where they are small enough, efficient enough, and economical enough, to allow their widespread use in small electrical devices. One use of these small solar energy systems is to recharge rechargeable batteries in small household devices.

One example of a small household electrical device with rechargeable batteries that can be recharged by one of these small solar energy systems is an outdoor landscaping lighting system. The rechargeable batteries provide power to illuminate the lighting elements during darkness, and the solar energy system collects and converts solar energy and recharges the rechargeable batteries during daylight.

Although the use of small solar energy systems in outdoor landscaping lighting systems represents great strides in the development and use of solar energy systems, there is a need for these miniaturized solar energy systems in other small electrical household devices.

SUMMARY OF THE INVENTION

There is a need for solar powered bird feeder.

Therefore, it is an object of the present invention to provide a solar powered bird feeder.

This object is achieved by providing a bird feeder having a rechargeable electrical power source and a solar energy system that collects solar energy, converts it into electrical energy, and uses the electrical energy to recharge the rechargeable electrical power source. The rechargeable electrical power source can be used to power lights, radios, cameras, and a wide variety of other electrical devices operably associated with the bird feeder.

The solar powered bird feeder according to the present invention provides significant advantages, including: (1) the rechargeable electrical power source can be recharged by the solar energy system; (2) the rechargeable electrical power source can provide power to a wide variety of electrical devices operably associated with the bird feeder; and (3) the lighting elements allow the bird feeder to be viewed and enjoyed at night. Other objects and advantages of the present invention will be evident from the following detailed description of the invention.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION OF THE PREFERRED EMBODIMENT

Figure 1:
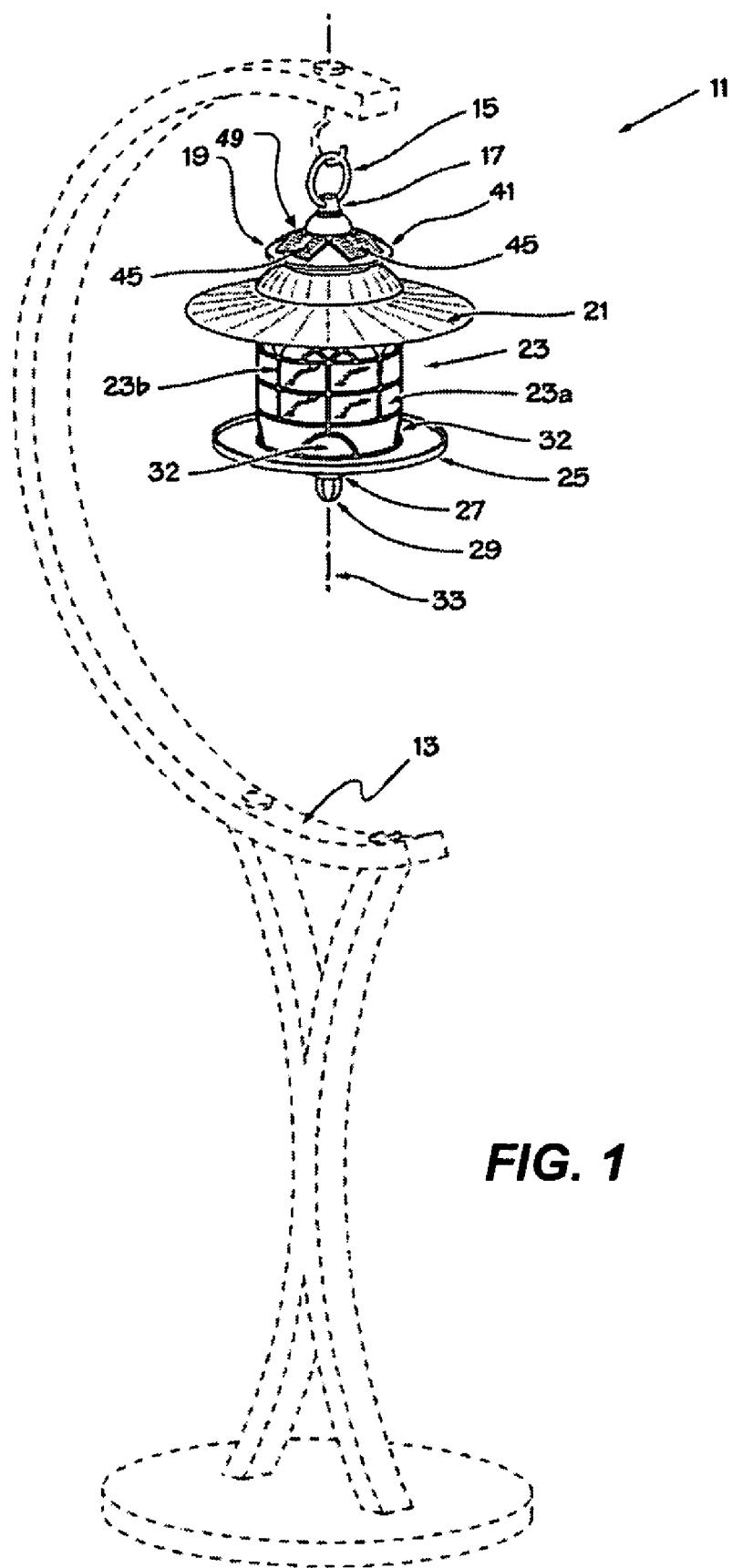
FIG. 1 is a perspective view of the solar powered bird feeder according to the present invention.
Figure 2:
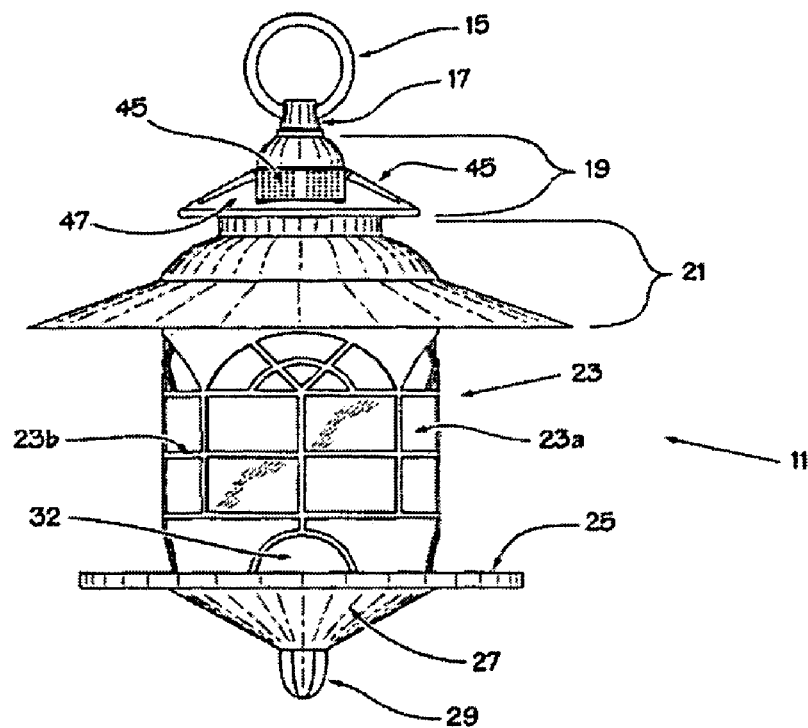
FIG. 2 is a front view of the solar powered bird feeder of FIG. 1.
Figure 3:
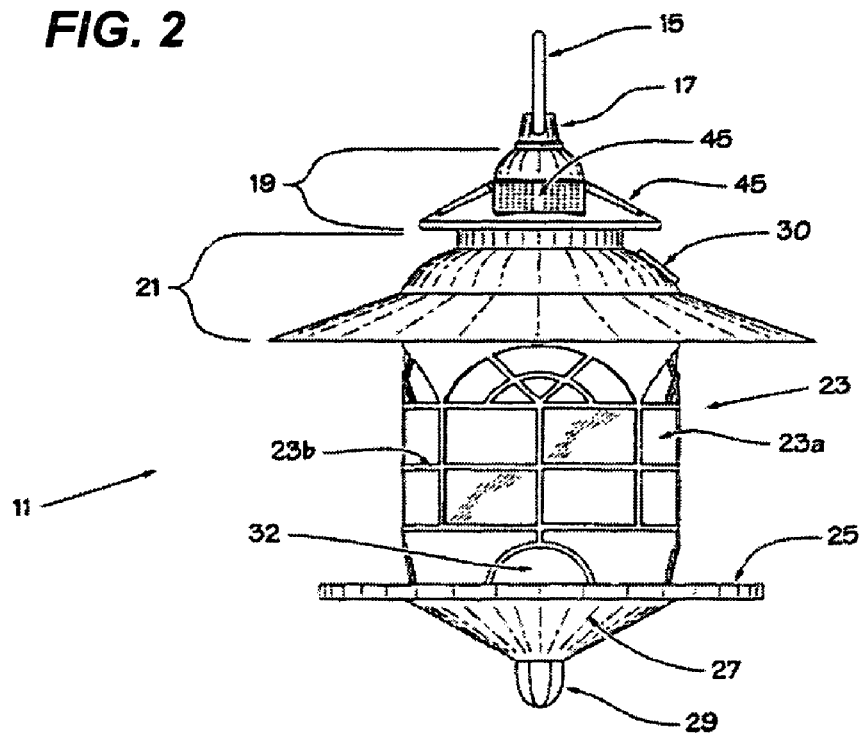
FIG. 3 is a right side view of the solar powered bird feeder of FIG. 1.
Figure 4:
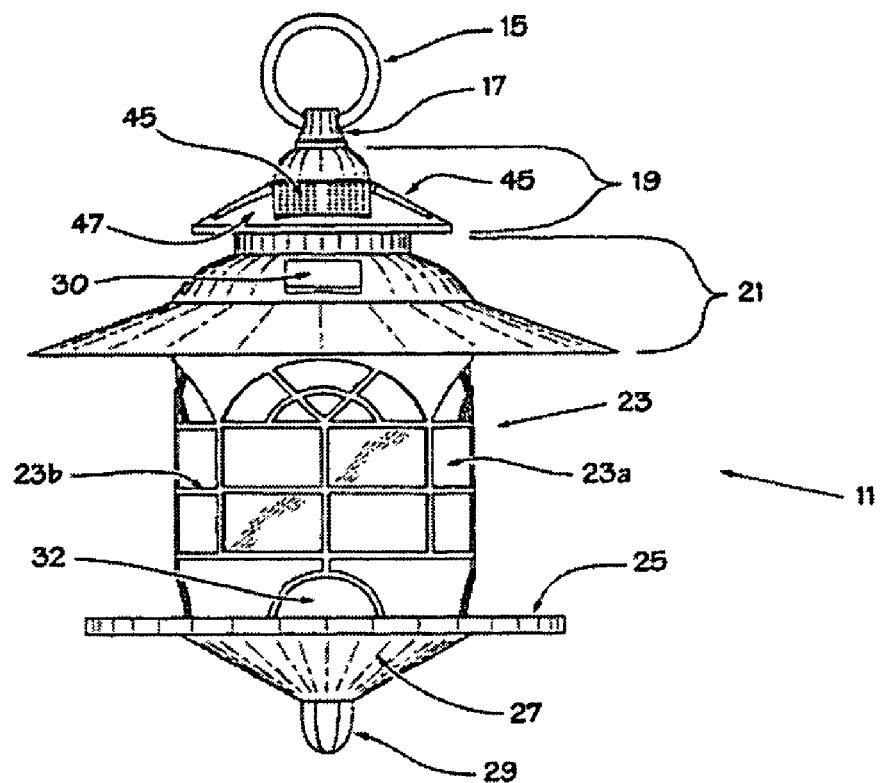
FIG. 4 is a rear view of the solar powered bird feeder of FIG. 1.
Figure 5:
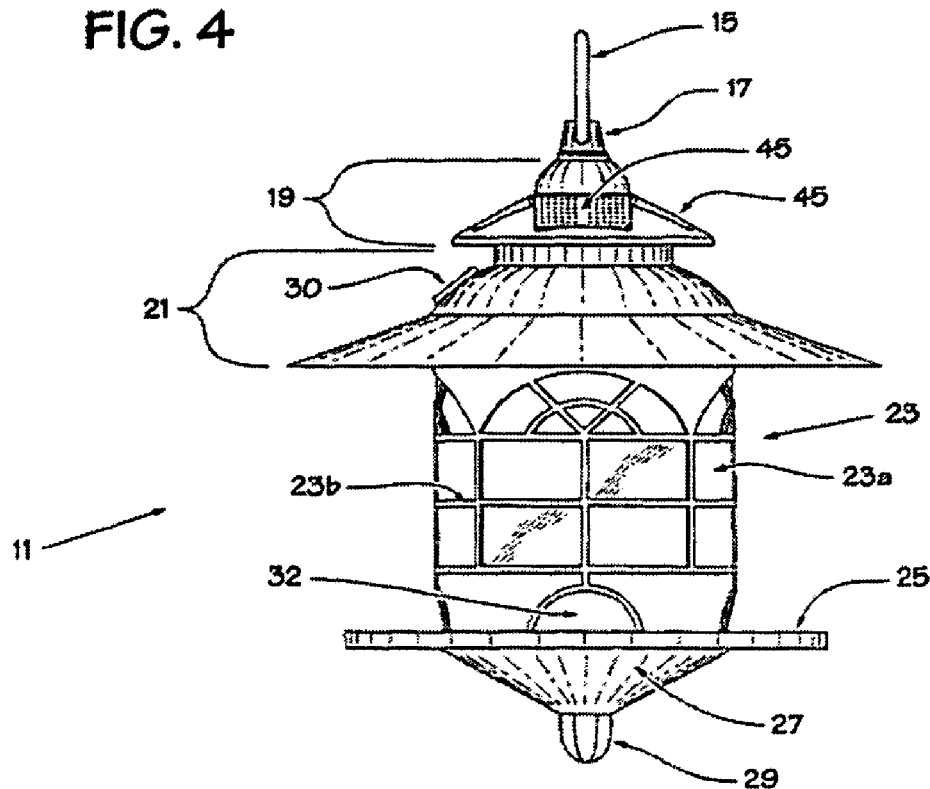
FIG. 5 is a left side view of the solar powered bird feeder of FIG. 1.
Figure 6:
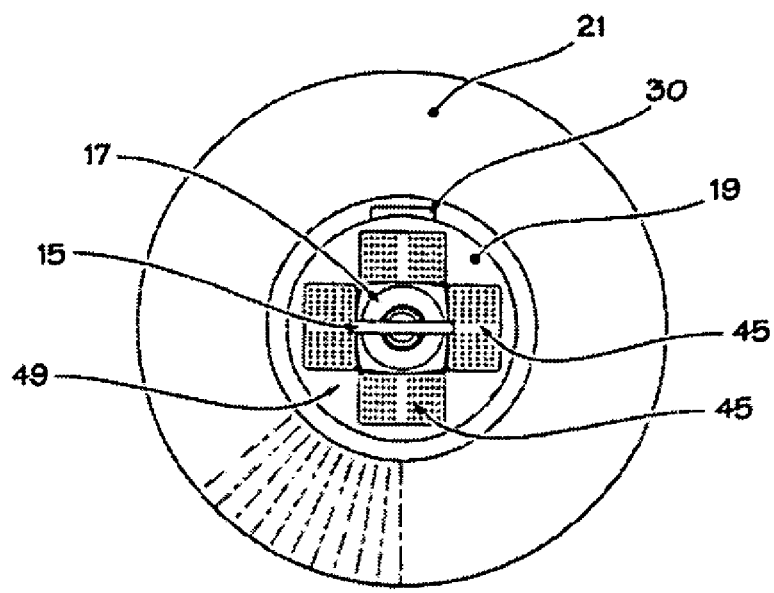
FIG. 6 is a top plan view of the solar powered bird feeder of FIG. 1.

Although the present invention will be described herein with reference to a bird feeder having a particular configuration, it should be understood that the methods and apparatuses of the present invention can be used on bird feeders and bird houses of almost any shape or design, as well as on other small animal feeders and houses. Thus, it will be appreciated that the rechargeable electrical power source and solar recharging system of the present invention is well suited for use on any decorative outdoor accessory.

Referring to FIGS. 1-10 in the drawings, the preferred embodiment of a solar powered bird feeder 11 according to the present invention is illustrated. Bird feeder 11 is adapted to be hung on a stand 13, in a tree, on a hanging bracket, from a rope or cable, or by any of a wide variety of conventional hanging means. Stand 13 is shown in dashed lines to indicate that stand 13 may be of any suitable design.

In the preferred embodiment, bird feeder 11 has a hanging means 15, an upper cap member 17, an upper canopy 19, a main canopy 21, a food reservoir 23, a perch 25, a lower portion 27, and a lower finial 29 (see FIGS. 1-5). Hanging means 15, upper cap member 17, upper canopy 19, main canopy 21, food reservoir 23, perch 25, lower portion 27, and lower finial 29 are coupled together by a rod 31 (see FIG. 8) that passes along a central longitudinal axis 33 of bird feeder 11 and that is releasably connected to lower finial 29 and upper cap member 17. It should be understood that rod 31 may also be a chain, wire, cable, or any other type of connecting means which aids in holding the components of bird feeder 11 together.

Upper cap member 17, upper canopy 19, main canopy 21, perch 25, lower portion 27, and lower finial 29 are preferably made of a suitable material that is treated, finished, and/or coated to prevent rust, wear, and exposure to the environment. It should be understood that hanging means 15, upper cap member 17, upper canopy 19, and main canopy 21 may be integrally combined into one or more component parts, depending on their shape, the application in which they are used, or the ornamental design that they are intended to represent. For example, these components may include embossed figurines or cut-out shapes that enhance the appearance or motif of birdfeeder 11.

Food reservoir 23 includes at least one outlet port 32 through which birds may gather the bird food. Outlet ports 32 may be located on food reservoir 23 at various locations and heights, such as at low locations near perch 25 or high locations near main canopy 21. Outlet ports 32 may also include flanges (not shown) that extend into or out of food reservoir 23 to prevent the bird food from spilling out of outlet ports 32 unnecessarily. Bird feeder 11 may also include additional perches that extend outwardly from food reservoir 23 for birds to use while gathering the bird food. Such additional perches are particularly useful for outlet ports 32 that are located well above perch 25.

Food reservoir 23 may include a liner portion 23a, preferably made of transparent glass or plastic, and a decorative lattice portion 23b, preferably made of a suitable material that is treated, finished, and/or coated to prevent rust, wear, and exposure to the bird food or the environment. Liner portion 23a may be beveled, etched, colored, tinted, or otherwise treated, depending upon the effect desired. For example, food reservoir 23 may be formed from leaded glass or stained glass having a decorative appearance or motif. Furthermore, it should be understood that the liner portion 23a and lattice portion 23b may be integrally combined to form a single component. For instances in which liner portion 23a and lattice portion 23b are separate components, it will be appreciated that lattice portion 23b may be disposed on either the inside or the outside of liner portion 23a. In addition or as an alternative, food reservoir 23 may comprise an open food reservoir 90 on perch 25 (see FIG. 9). Perch 25 may include a plurality of tabs which provide spacing and a means of forming an open air food reservoir 90.

A food access port 28 is disposed in main canopy 21 to allow a user to fill food reservoir 23 with bird food without disassembling bird feeder 11. Food access port 28 is preferably covered by a cap 30 (see FIGS. 3-5, 6, and 8) to protect the bird food in food reservoir 23 from the weather. Cap 30 may be attached to bird feeder 11 by a wide variety of attachment means. It should be understood that food access port 28 may be located in several locations on bird feeder 11, depending upon the application in which bird feeder 11 is used, and the effect that is desired.

A rechargeable electrical power source 41 is operably associated with bird feeder 11 to provide electrical power to bird feeder 11. In the preferred embodiment, rechargeable electrical power source 41 is disposed within upper canopy 19. It will be appreciated that rechargeable electrical power source 41 may also be disposed in other components of bird feeder 11, such as perch 25 or lower portion 27, and may be disposed in multiple components of bird feeder 11. Rechargeable electrical power source 41 is preferably two 1.2 Volt rechargeable AA NiCd batteries providing about 600 milliamps of current, but may be any of a wide variety of rechargeable batteries. An electrical charging system 43 (see FIG. 8) is conductively coupled to rechargeable electrical power source 41. Electrical charging system 43 may include an electrical access port (not shown) to receive an adapter or transformer (not shown) that allows rechargeable electrical power source 41 to be recharged by a conventional AC power source, such as an AC wall outlet. It will be understood that rechargeable electrical power source 41 may be used to power a wide variety of electrical devices, such as microphones, radio receivers or transmitters, cameras, audio recording and playback devices, video recording and playback devices, loud speakers, lighting elements, timing devices, remote controls, motors, etc.

At least one conventional solar collector 45 is operably associated with bird feeder 11 to collect solar energy. In the preferred embodiment, at least one solar collector 45 is disposed on the upper surface of upper canopy 19. Solar collectors 45 either include or are conductively coupled to a conventional solar energy conversion system 47 that converts the solar energy to electrical energy (see FIGS. 2, 4, and 8). Electrical charging system 43 uses the electrical energy from the solar energy conversion system 47 or the AC power outlet to recharge rechargeable electrical power source 41. An optional photo resistor 49 disposed on the upper surface of upper canopy 19 is conductively coupled to rechargeable electrical power source 41 to detect the amount of light hitting bird feeder 11 and to provide a corresponding electrical signal that can be used to determine whether power is supplied to certain electrical components.

In the preferred embodiment, the electrical power from rechargeable electrical power source 41 is used to illuminate a LED electrical subsystem comprising at least one lighting element 51. It is preferred that lighting element 51 either be positioned to cast light on and/or through food reservoir 23, perch 25, and as many other components of bird feeder 11 as possible or to cast light on and/or through food reservoir 23, main canopy 21, and as many other components of bird feeder 11 as possible. In the preferred embodiment, lighting elements 51 are disposed either beneath main canopy 19 or disposed on perch 25. Lighting elements 51 preferably illuminate food reservoir 23, upper canopy 21, and perch 25 in a decorative fashion. Thus, it will be appreciated that the configuration and choice of materials for food reservoir 23 may produce a distinctive effect on the appearance of bird feeder 11 while being illuminated by lighting elements 51. In the preferred embodiment, lighting elements 51 comprise one or more LED's. It should be understood that lighting elements may also be fluorescent lighting elements, cold cathode ray tube lighting elements, and/or any other suitable lighting elements.

Figure 7:
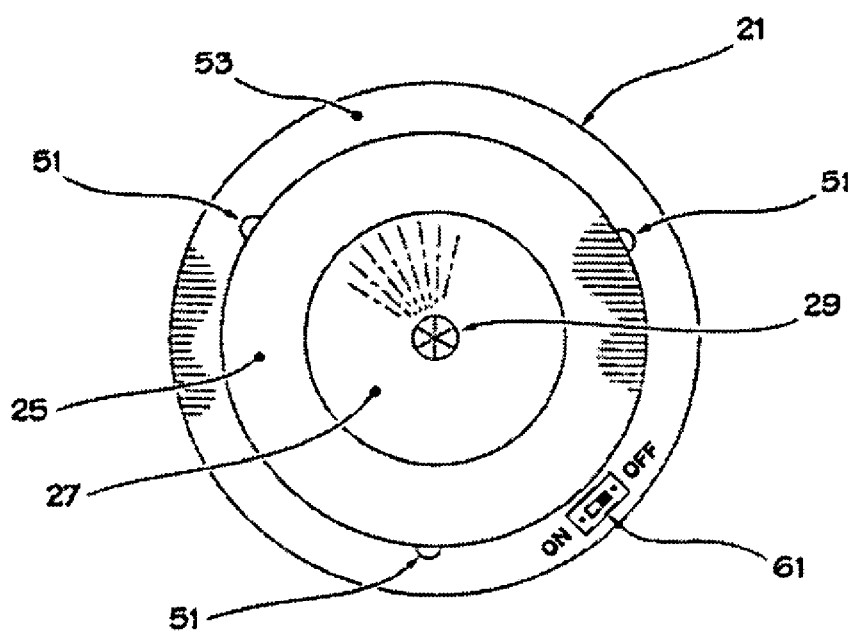
FIG. 7 is a bottom view of the solar powered bird feeder of FIG. 1.
Figure 8:
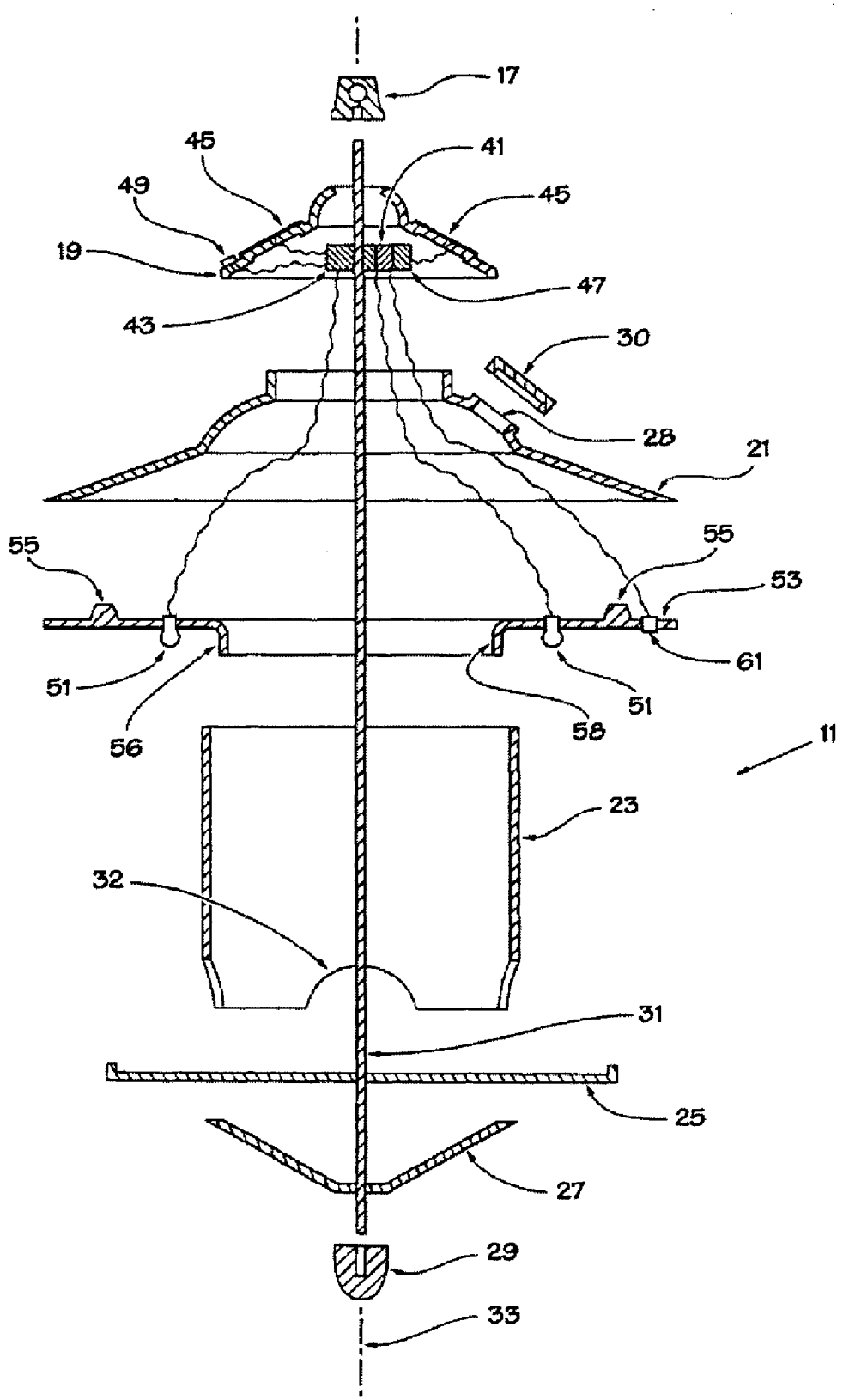
FIG. 8 is an exploded longitudinal cross-sectional view of the solar powered bird feeder of FIG. 1.

In the preferred embodiment, lighting elements 51 are carried by an alignment disk 53 (see FIGS. 7 and 8). Alignment disk 53 is disposed between main canopy 21 and food reservoir 23. It should be understood that alignment disk 53 may be integral with either main canopy 21 or food reservoir 23, or both main canopy 21 and food reservoir 23. Alignment disk 53 includes a plurality of tabs 55 which provide spacing and a means of attaching alignment disk 53 to main canopy 21. Alignment disk 53 may include an annular flange 56 that extends downward from a central aperture 58 (see FIG. 8). Flange 56 preferably has an outside diameter that is slightly smaller that the inside diameter of food reservoir 23, such that flange 56 may protrude slightly into the interior of food reservoir 23. This aligns and centers food reservoir 23 about axis 33. It should be understood that the functions of alignment disk 53 may be achieved by other means, such as tabs, spacers, posts, or clips coupled to main canopy 19. Alignment disk 53, or its functional equivalent, may include conduits or clips for aligning and/or holding and protecting any electrical wiring that is necessary for any electrical components that are operable on birdfeeder 11.

An optional on/off switch 61 may be disposed on bird feeder 11 and conductively coupled to rechargeable electrical power source 41 to provide a means to manually activate and deactivate the power from rechargeable electrical power source 41, the power to lighting elements 51, and/or any other electrical components that may be operably associated with bird feeder 11 (see FIGS. 7 and 8). On/Off switch 61 is preferably disposed beneath main canopy 21 on alignment disk 53. In the preferred embodiment, on/off switch 61 overrides the switching functions of photo resistor 49. It should be understood that one or more on/off switches 61 and their corresponding control circuitry may be utilized to control the various electrical components on bird feeder 11.

Figure 9:
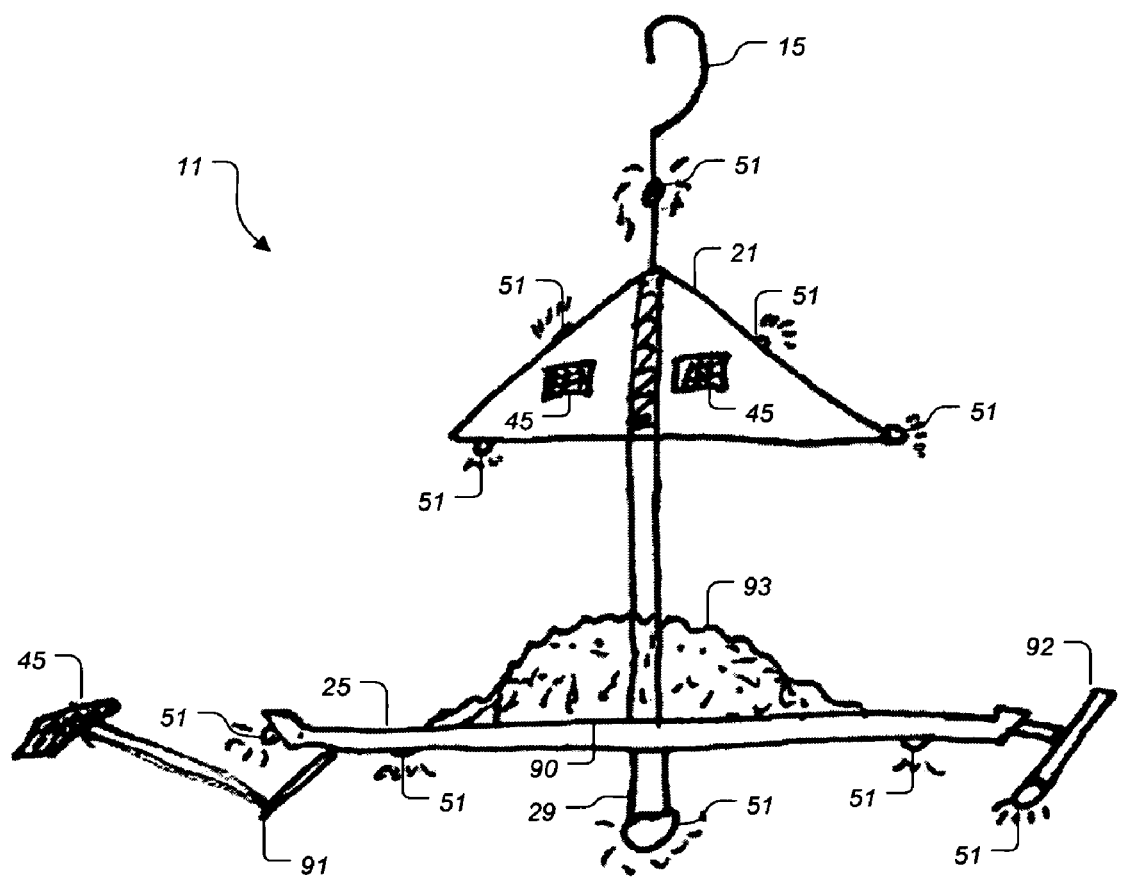
FIG. 9 is a front view of the solar powered bird feeder according to the present invention.

In addition or as an alternative, solar powered bird feeder 11 may comprise an open food reservoir 90 above perch 25 to allow for bird seed 93 to be deposed thereon, extension arm 91, and adjustable pen light 92 (see FIG. 9). Solar collector 45 may alternatively or additionally be located via extension arm 91 extending outwardly from perch 25. It is preferred that lighting element 51 either be positioned to cast light on open food reservoir 90, and/or on bird seed 93, and as many other components of bird feeder 11 as possible or to cast light on food perch 25, main canopy 21, and as many other components of bird feeder 90 as possible. In the preferred embodiment, lighting elements 51 are disposed either above or beneath main canopy 21, above or beneath perch 25, or disposed thereon to hanging means 15, main canopy 21, perch 25 or lower finial 29. Lighting elements 51 preferably illuminate food reservoir 23, bird seed 93, main canopy 21, and perch 25 in a decorative fashion. It is recalled from the above discussion that lighting elements 51 comprise one or more LED's and may also be fluorescent lighting elements, cold cathode ray tube lighting elements, and/or any other suitable lighting elements.

Figure 10:
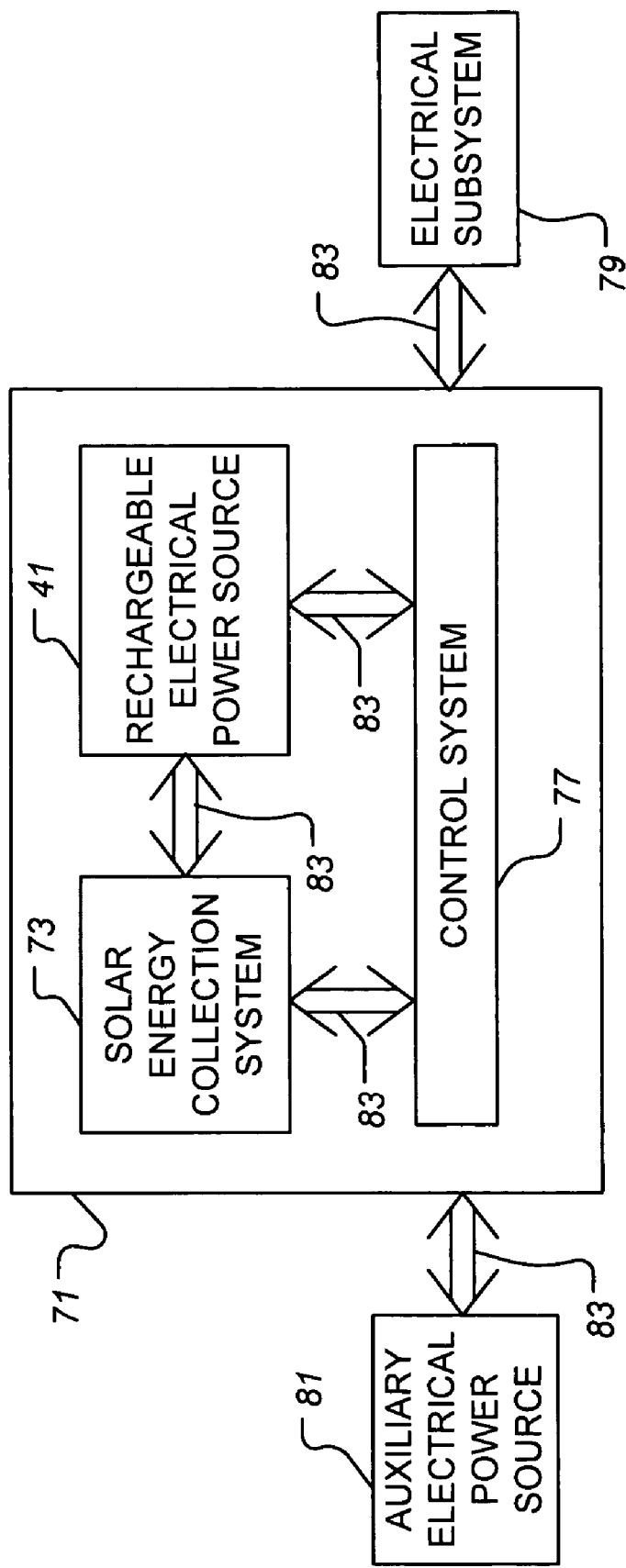
FIG. 10 is a block diagram of a solar energy system according to the present invention.

Now referring to FIG. 10, the preferred embodiment of solar energy system 71 according to the present invention is illustrated. Solar energy system 71 preferably comprises a solar energy collection system 73, a rechargeable electrical power source 41, and a control system 77. Solar energy system 71 is preferably conductively coupled to an electrical subsystem 79. Solar energy system 71 may optionally be conductively coupled to an auxiliary electrical power source 81. Conductive coupling is preferably achieved through the use of electrical conductors 83 such as insulated copper wires, circuit boards, or other suitable devices or means for conductively coupling electrical components.

Solar energy collection system 73 preferably comprises a solar collector 45 (see FIGS. 1-6 and 8) and other necessary circuitry for receiving and collecting solar energy and converting the solar energy into electrical energy. Solar energy collection system 73 is preferably conductively coupled to both rechargeable electrical power source 41 and control system 77 with electrical conductors 83. Rechargeable electrical power source 41 preferably comprises a rechargeable battery for storing electrical energy; however, rechargeable electrical power source 41 may alternatively comprise any rechargeable electrical power storage device, such as a capacitor, battery pack, any other suitable device for storing electrical energy, or combination thereof. Rechargeable electrical power source 41 is preferably conductively coupled to solar energy collection system 73 and control system 77 with electrical conductors 83.

The purpose of solar energy system 71 is preferably to convert solar energy into electrical energy and to supply that electrical energy to one or more electrical subsystems 79. In operation, solar energy collection system 73 preferably converts solar energy into electrical energy. Solar energy collection system 73 preferably delivers electrical energy to rechargeable electrical power source 41 to provide a trickle charge to rechargeable electrical power source 41. However, when rechargeable electrical power source 41 is fully charged, solar energy collection system 73 preferably delivers electrical energy to control system 77 where the electrical energy is preferably diverted for uses other than charging rechargeable electrical power source 41. For example, the electrical energy could be used to directly power electrical subsystem 79 rather than electrical subsystem 79 consuming power from rechargeable electrical power source 41.

Auxiliary electrical power source 81 preferably comprises an alternating current power source such as power from a conventional AC outlet; however, auxiliary electrical power source 81 may alternatively comprise a direct current power source such as a non-rechargeable battery, one or more fuel cells, a renewable energy source such as a wind powered generator, a rechargeable battery pack (in which the battery pack is removed, recharged remotely, and thereafter replaced back into auxiliary electrical power source 81), or any other electrical power source suitable for providing solar energy system 71 with additional electrical energy. Of course, the foregoing configuration allows for the interchanging, or swapping, of battery packs. Auxiliary electrical power source 81 is preferably conductively coupled to solar energy system 71 and preferably delivers electrical energy to control system 77. Auxiliary electrical power source 81 preferably supplies electrical energy for a variety of uses including: powering electrical subsystem 79, recharging rechargeable electrical power source 41, and powering other solar energy system 71 circuitry such as control system 77.

Alternative embodiments of solar energy system 71 may not include the solar energy collection system 73. Instead, solar energy system 71 may comprise a circuit for powering electrical subsystem 79 operable only by electrical energy supplied by auxiliary electrical power source 81.

Control system 77 preferably comprises circuitry, microprocessors, memory devices, sensors, switches, and other electronic components necessary to: partially or fully direct electrical energy from solar energy collection system 73 to rechargeable electrical power source 41, fully or partially direct electrical energy from solar energy collection system 73 to electrical subsystem 79, allow a user to manually switch solar energy system 71 on and off, receive input to alter or control the performance of the recharging of rechargeable electrical power source 41 and/or the supply of electrical energy to electrical subsystems 79, control the performance of electrical subsystems 79, fully or partially charge rechargeable electrical power source 41 with electrical energy supplied by auxiliary electrical power source 81, and fully or partially power electrical subsystem 79 with electrical energy from auxiliary power source 81.

It should be appreciated that while solar energy system 71 comprises control system 77 in this preferred embodiment, simpler and less sophisticated embodiments of solar energy system 71 are possible. For example, solar energy system 71 may not comprise control system 77, but merely comprise solar energy collection system 73 and rechargeable electrical power source 41 conductively coupled to each other with electrical conductors 83.

Electrical subsystem 79 is preferably a lighting subsystem for providing illumination. Lighting subsystem preferably comprises lighting elements 51 conductively coupled to solar energy system 71. Lighting elements 51 are preferably light emitting diodes (LEDs), but may be organic light emitting diodes, incandescent bulbs, cold cathode ray tubes, fluorescent lights, or any other suitable electrical lighting apparatus, or combination thereof. It should be appreciated that the electrical subsystem 79 of alternate embodiments of the present invention may be a water pumping subsystem, sound subsystem, video subsystem, microphone subsystem, receiving and transmitting subsystem, motion actuating subsystem, cooling subsystem, heating subsystem, raising and lowering subsystem, water agitation subsystem, electrical motor subsystem, any other electrically powered subsystem, or combination thereof.

A translucent shield, a lens, reflector, light fixture, or a combination of these may optionally be attached to or operably associated with the lighting subsystem to enhance or alter the illumination provided by lighting elements 51. The optional shields, lenses, reflectors, and fixtures may also be configured to prevent water, dirt, or other particulate matter from interfering with the operation of lighting elements 51. Further, it should be appreciated that the optional shields, lenses, reflectors, and fixtures may be incorporated into any embodiment of the present invention.

It should be appreciated that the lighting subsystem and control system 77 may include selected components, circuitry, and microprocessor control chips to produce a variety of optional features. For example, optional features may include: manual lighting intensity controls, blinking lights, fading lights, changing the light color, motion activated lighting, sound activated lighting, a wide variety of lighting sequence or motion effects, and any other appropriate lighting effects or interactive means for controlling lighting effects. Of course, any components, circuitry, microprocessor control chips, or other means of controlling or altering the functionality of electrical subsystem 79 would be conductively coupled to solar energy system 71, electrical subsystem 79, and/or auxiliary electrical power source 81. Further, where electrical subsystem 79 is not a lighting subsystem, it should be appreciated that similar controls, programming capabilities, interactive input devices, and other electrical subsystem 79 performance controls or alteration means may be incorporated into the electrical subsystem 79 and/or the associated control system 77.

A photo cell, or photo resistor 49 (see FIG. 1), is preferably incorporated into the preferred embodiment of control system 77. Photo resistor 49 detects the presence of light and controls whether lighting elements 51 provide illumination, by switching lighting elements 51 on or off, or by regulating the intensity of light provided by lighting elements 51. For example, when photo resistor 49 detects a substantial amount of light, lighting elements 51 are switched off and provide no illumination. However, when photo resistor 49 detects a low level of light, lighting elements 51 are switched on and provide illumination. Alternatively, photo resistor 49 may be used to dim or brighten the output of lighting elements 51. In addition, one or more on-off switches or buttons may be incorporated into control system 77 to facilitate the operation of solar energy system 71, or to vary the operation and control of solar energy system 71, auxiliary electrical power source 81, or electrical subsystem 79. It will be appreciated that the operation of solar energy system 71, auxiliary electrical power source 81, and electrical subsystem 79 may be controlled remotely by infrared light, radio wave, or other types of transmitters and receivers.

It should be appreciated that solar energy system 71 may further comprise or be conductively coupled to a connection port for conveniently interfacing solar energy system 71 with other components, systems, subsystems, or any other suitable devices. The connection port is preferably conductively coupled with control system 77; however, connection port may alternatively be conductively coupled to any other component of solar energy system 71, auxiliary electrical power source 81, or electrical subsystem 79. More specifically, connection ports may be adapted to interface with electrical devices electrical devices having power plugs compatible with the connection port. Connection ports would be a great convenience because electrical devices such as lights, fans, radios, or other suitable electrical devices could be supplied power or controlled by solar energy system when connected to the connection port.

Components of solar energy system 71, auxiliary electrical power source 81, and electrical subsystem 79 may be located substantially near each other. For example, in the preferred embodiment, with the exceptions of solar collectors 45, photo resistor 49, and lighting elements 51, much of the circuitry of solar energy system 71, auxiliary electrical power source 81, and electrical subsystem 79 is preferably substantially housed within an enclosure, such as for example within upper canopy 19 (see FIG. 5). It should be appreciated that the components of solar energy system 71, auxiliary electrical power source 81, and electrical subsystem 79 are preferably substantially protected such that water, dirt, and other matter is prevented from interfering with the operation of solar energy system 71, auxiliary electrical power source 81, and electrical subsystem 79. It should also be appreciated that in alternative embodiments, components of solar energy system 71, auxiliary electrical power source 81, and electrical subsystem 79 may not be housed in enclosure 85 and may be located substantial distances from each other while remaining conductively coupled. For example, an alternative embodiment of the present invention may be configured such that solar collector 45 is located on a home rooftop and is conductively coupled to rechargeable electrical power source 41, other components, systems, and/or subsystems which are located a significant distance away from solar collector 45, such as near the ground level of the home.

It should be appreciated that the enclosure may alternatively be adapted to carry all or substantially all of the components of solar energy system 71, electrical subsystem 79, and auxiliary electrical power source 81. In alternative embodiments of the present invention, enclosure 85 may be shaped and adapted for easy connection to and disconnection from the structure supporting enclosure 85. For example, an embodiment of enclosure 85 may allow enclosure 85 to be removably attached to the structure supporting enclosure 85, subsequently detached from the structure, and later removably attached to a different supporting structure. Alternatively, enclosure 85 may be integrally or sealably attach to a supporting structure. For example, enclosure 85 may be attached such that it passes through a hole in a supporting structure and forms a watertight seal with that hole. It should be appreciated that in alternative embodiments where enclosure 85 carries the entire solar energy system and/or other circuitry or systems, enclosure 85 may be inset, inlaid, or disposed in a recessed space of the supporting structure. Further, enclosure 85 may alternatively be attached to different types of structures or embodiments of the present invention suitable for supporting or carrying enclosure 85.

Components of solar energy system 71, auxiliary electrical power source 81, and electrical subsystem 79 may located and/or operably associated with various locations on each embodiment of the solar powered bird feeder, including in the upper canopy, under the main canopy, under the perch, in the support members, and in the food reservoir. Additionally, components of solar energy system 71, auxiliary electrical power source 81, and electrical subsystem 79 systems may be located remote from and even significantly distant from each solar powered bird feeder. Enclosure 85 is preferably located in a hollow portion of upper canopy 19 between; however, it should be appreciated that in some embodiments of the present invention, one or more components of solar energy system 71 may be located remote from upper canopy 19.

Solar collector 45 may be located at any suitable location on or about solar powered bird feeder 11 or remote from solar powered bird feeder 11; however, it is preferred that solar collector 45 be optimally exposed to solar light. Solar collector 45 is preferably attached to upper canopy 19, but may alternately be located via extension arm 91 extending outwardly from perch 25 (see FIG. 9). For those applications in which solar powered bird feeder 11 is primarily a decorative piece displayed indoors, it may be desirable to locate solar collector 45 at a location on solar powered bird feeder 11 that is near or faces a window, or at a location remote from solar powered bird feeder 11 where the remote location may have different ambient lighting conditions. For example, if solar powered bird feeder 11 is located indoors with low levels of light available for conversion to electrical energy by solar collector 45, solar collector 45 may be located outdoors to expose solar collector 45 to more light. It should be understood that sufficiently long electrical conductors 83 are incorporated to achieve remote placement of solar collectors 45 and other remotely located electrical components. For similar reasons, photo resistor 49 is also preferably attached to upper canopy 19, but may alternately be located remote from upper canopy 19.

Lighting elements 51 are preferably attached to alignment disk 53 (see FIGS. 7 and 8). Lighting elements 51 may also optionally be operably associated with the upper canopy 19, main canopy 21, or perch 25. Lighting elements 51 preferably illuminate solar powered bird feeder 11 and/or the space in and around solar powered bird feeder 11. Specifically, lighting elements 51 are preferably connected to perch 25 and arranged to illuminate food reservoir 23. It should be appreciated that lighting elements 51 may alternatively be located remote from solar powered bird feeder 11 such that lighting elements 51 provide illumination to spaces significantly remote from solar powered bird feeder 11. For example, multiple lighting elements 51 may be located remote from solar powered bird feeder 11 so that the remotely located lighting elements 51 illuminate a path or walkway leading to solar powered bird feeder 11.

It should be appreciated that solar powered bird feeder 11 may alternatively be constructed of optically conductive material such as glass or a translucent plastic. Where solar powered bird feeder 11 is constructed of an optically conductive material, lighting elements 51 may be located within upper canopy 19, main canopy 21, or perch 25, thereby optionally creating a glowing illumination effect.

It will be appreciated that an invention with significant advantages has been described. Although the present invention is shown in a limited number of forms, it is not limited to just these forms, but is amenable to various changes and modifications without departing from the spirit thereof.

What is claimed is:

1. A bird feeder, comprising:
   a canopy portion;
   a food reservoir coupled to the canopy portion;
   a perch portion proximate the food reservoir
   a rechargeable electrical power source;
   a solar energy system conductively coupled to the electrical charging system for collecting solar energy, converting the solar energy into electrical energy, and transferring the electrical energy to the electrical charging system; and
   at least one LED lighting subsystem carried by said perch portion and electrically coupled to said rechargeable electrical power source for receiving electrical energy therefrom and for illuminating said food reservoir from said perch so that said food reservoir is visible in low light conditions.

2. A bird feeder according to claim 1, further comprising:
a mechanical subsystem for releasably connecting together the canopy portion, the food reservoir, and the perch portion.

3. A bird feeder according to claim 1, further comprising:
an electrical charging system conductively couple to the rechargeable electrical power source for recharging the rechargeable electrical power source.

4. The bird feeder according to claim 1, further comprising:
a photo resistor conductively coupled to the rechargeable electrical power source for activating and deactivating the rechargeable electrical power source depending upon the amount of light hitting the photo resistor.

5. A bird feeder, comprising:
a canopy portion;
a perch portion below the canopy portion;
a rechargeable electrical power source;
a solar energy system carried by said perch portion and conductively coupled to the electrical charging system for collecting solar energy, converting the solar energy into electrical energy, and transferring the electrical energy to the electrical charging system; and
an LED lighting subsystem directly carried by said perch portion and electrically coupled to said rechargeable electrical power source for receiving electrical energy such that the LED lighting subsystem illuminates a substantial portion of the bird feeder in a front-lit fashion so that said bird feeder is visible in low light conditions.

6. A bird feeder according to claim 5, further comprising:
a mechanical subsystem for releasably connecting together the canopy portion and the perch portion.

7. A bird feeder according to claim 5, further comprising:
an electrical charging system conductively coupled to the rechargeable electrical power source for recharging the rechargeable electrical power source.

8. The bird feeder according to claim 5, further comprising:
a photo resistor conductively coupled to the rechargeable electrical power source for activating and deactivating the rechargeable electrical power source depending upon the amount of light hitting the photo resistor.

9. A bird feeder, comprising:
at least one canopy portion;
a perch portion operably associated with said canopy such that said canopy is above said perch portion when the bird feeder is positioned for use;
a rechargeable electrical power source;
a solar energy system conductively coupled to the electrical charging system for collecting solar energy, converting the solar energy into electrical energy, and transferring the electrical energy to the electrical charging system;
a photo resistor conductively coupled to the rechargeable electrical power source for activating and deactivating the rechargeable electrical power source depending upon the amount of light hitting the photo resistor; and
an LED electrical subsystem carried by said perch portion and electrically coupled to said rechargeable electrical power source for receiving electrical energy therefrom and for illuminating said canopy portion so that said canopy portion is visible in low light conditions.

10. A bird feeder according to claim 9, further comprising:
wherein said solar energy system is carried by the perch portion.

11. A bird feeder according to claim 9, further comprising:
an electrical charging system conductively coupled to the rechargeable electrical power source for recharging the rechargeable electrical power source.

12. A perch for a bird feeder, comprising:
a rechargeable electrical power source;
an electrical charging system conductively couple to the rechargeable electrical power source for recharging the rechargeable electrical power source;
a solar energy system conductively coupled to the electrical charging system for collecting solar energy, converting the solar energy into electrical energy, and transferring the electrical energy to the electrical charging system;
a photo resistor conductively coupled to the rechargeable electrical power source for activating and deactivating the rechargeable electrical power source depending upon the amount of light hitting the photo resistor; and
at least one electrical subsystem coupled to said rechargeable electrical power source for receiving electrical energy therefrom, including at least one LED light.

13. A perch according to claim 12, further comprising:
a housing adapted to attach to a lower end of a food reservoir.

14. A perch according to claim 13, further comprising:
a mechanical subsystem for releasably connecting a food reservoir to the perch.

15. A perch according to claim 13, further comprising:
a mechanical subsystem for releasably connecting a canopy to the perch.

16. A decorative lighting system carried by a bird feeder comprising:
a rechargeable electrical power source;
an electrical charging system conductively couple to the rechargeable electrical power source for recharging the rechargeable electrical power source;
a solar energy system conductively coupled to the electrical charging system for collecting solar energy, converting the solar energy into electrical energy, and transferring the electrical energy to the electrical charging system;
a photo resistor conductively coupled to the rechargeable electrical power source for activating and deactivating the rechargeable electrical power source depending upon the amount of light hitting the photo resistor; and
a decorative lighting subsystem coupled to said rechargeable electrical power source for receiving electrical energy such that the decorative lighting subsystem illuminates a substantial portion of the bird feeder in a front-lit fashion as directed by the photo resistor in low light situations, 17. The decorative lighting system of claim 16 wherein said decorative lighting subsystem further comprises an LED light positioned to decoratively illuminate a bird feeder.

18. The decorative lighting system of claim 16 wherein said decorative lighting subsystem further comprises a plurality of LED lights arranged to decoratively illuminate a bird feeder.

* * * * *